Sept. 22, 1970 E. BIERMAN 3,530,253

PARTY LINE CIRCUIT USING DIODES IN RINGING CONTROL, LOCKOUT, AND REVERTIVE CALLING

Filed Feb. 20, 1967

3 Sheets-Sheet 1

INVENTOR.
ERIC BIERMAN
BY Rogers, Bereskin, & Parr

Sept. 22, 1970 E. BIERMAN 3,530,253

PARTY LINE CIRCUIT USING DIODES IN RINGING CONTROL, LOCKOUT, AND REVERTIVE CALLING

Filed Feb. 20, 1967 3 Sheets-Sheet 2

INVENTOR.
ERIC BIERMAN

BY Rogers, Bereskin, & Parr

INVENTOR.
ERIC BIERMAN
BY Rogers, Bereskin, & Parr

United States Patent Office 3,530,253
Patented Sept. 22, 1970

3,530,253

PARTY LINE CIRCUIT USING DIODES IN RINGING CONTROL, LOCKOUT, AND REVERTIVE CALLING

Eric Bierman, Toronto, Ontario, Canada, assignor to Northern Electric Company Limited, Montreal, Quebec, Canada Filed Feb. 20, 1967, Ser. No. 617,254
Int. Cl. H04m *1/70*
U.S. Cl. 179—17 11 Claims

ABSTRACT OF THE DISCLOSURE

A party line system arranged for secrecy and revertive calling, in which two party stations are oppositely connected to two line conductors from a central office. Each station has two diodes in series between the line conductors (the diodes of one station being poled oppositely to those of the other station), and ringing means connected between ground and a point between the diodes. When a revertive call is made, a revertive call relay set in the central office applies to one line conductor a ringing voltage having A.C. and D.C. components. The ringing voltage enters only the called station, not the calling station, because the D.C. component reverse biases a diode of the calling station. When the called party answers, the ringing current D.C. level increases to terminate ringing. Common polarity talking potential is then applied through supervision relays to both line conductors.

This invention relates to party line telephone circuits, and more particularly, it relates to circuits for a two party line system arranged for substantial secrecy and for revertive calling.

It is often desired to arrange a two party line so that one party on the line may make or receive calls without the possibility of being overheard by the other party on the line. A number of proposals have been made to achieve this objective, but these proposals generally have been clostly and complicated and in addition typically do not provide for revertive calling without special apparatus, such as a mechanical interlock, at the subscriber telephone. (A revertive call is a call in which one party on the line calls the other party.)

Accordingly, it is an object of the present invention to provide an arrangement that will provide a substantial degree of secrecy and yet in which revertive calls may be made without the need for equipment such as a mechanical interlock at the subscriber premises. A typical subscriber station according to the invention includes a pair of diodes connected in series with the telephone handset between a pair of line conductors from a central office. Ringing means are connected to a point between the diodes. When a subscriber at the station makes a call, seizure of appropriate equipment at the central office occurs from ground through a first of the diodes. The second diode prevents seizure of central office equipment associated with the other subscriber station. When the call is a revertive call, the second diode substantially prevents ringing current from entering the subscriber station, and once such revertive call is established, the first diode prevents talking potential applied by the central office from being diverted through the ringing means of the subscriber station.

The central office will typically include a revertive call relay set operative upon occurrence of a revertive call. Such revertive call relay set includes means for applying a ringing voltage having superimposed D.C. and A.C. components, the D.C. component being large enough substantially to reverse bias the first diode of the calling station. This substantially prevents ringing current from entering the calling party's telephone, as mentioned, so that the calling party's telephone will not ring, and so that ringing will not terminate until the called party answers.

When the called party answers, the central office typically applies a common polarity talking potential over both line conductors to the subscriber stations.

Further objects and advantages of the invention will appear from the following disclosure, taken together with the accompanying drawings, in which.

Figure 1:
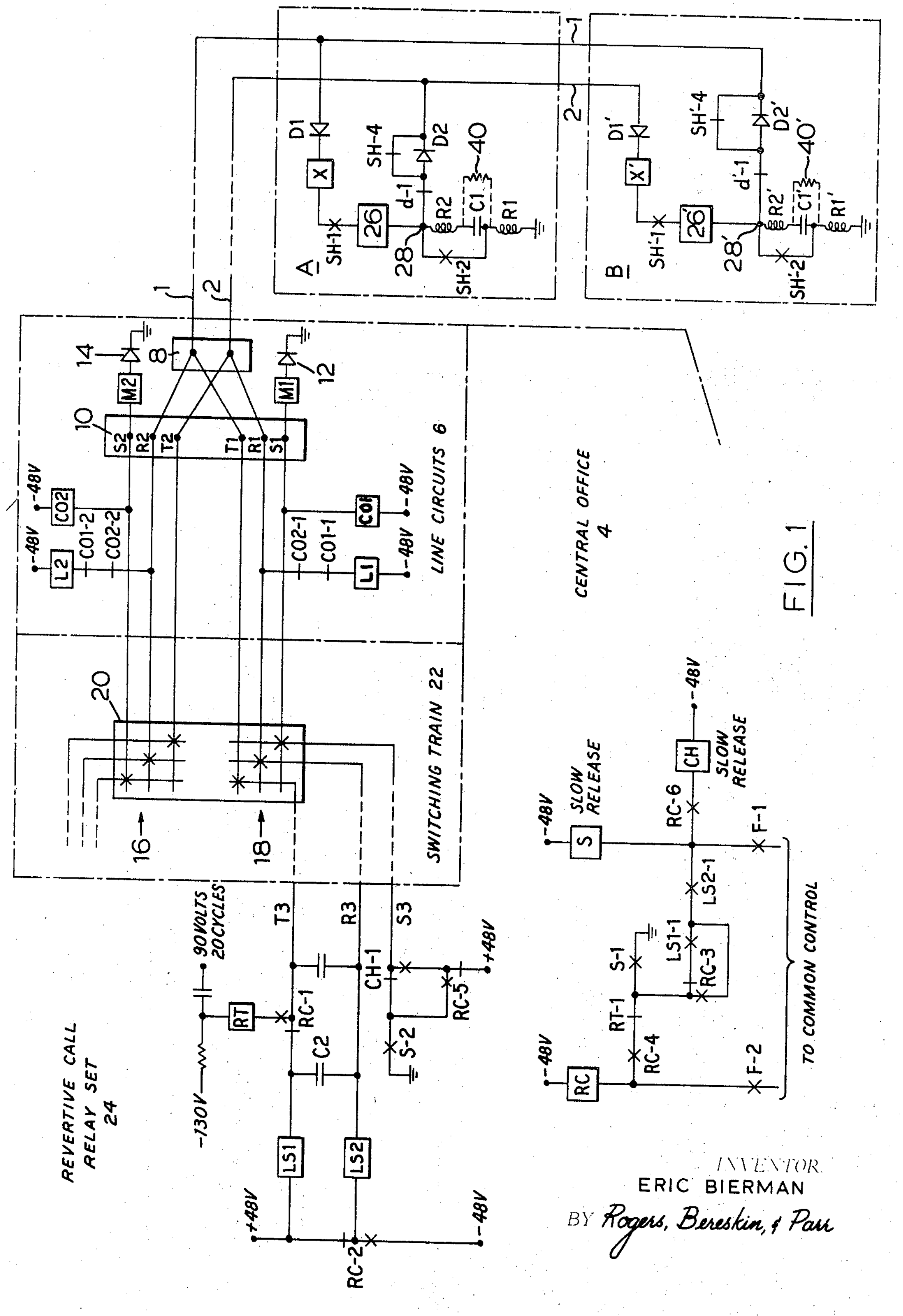
FIG. 1 shows a circuit, partly in block diagram form, for two subscriber stations and a portion of a central office according to the present invention.

In the drawings detached contact notation has been used throughout. Thus, for examples, the notation "RC" on the drawings indicates relay RC, while RC–4 indicates contact number four of relay RC. If a contact is marked with an "X," it is normally open (i.e. open when its associated relay is released or deenergized), while if a contact is marked with a "–", it is normally closed (i.e. closed when is associated relay is released).

Reference is first made to FIG. 1, which shows two subscriber stations A and B both connected to a common pair of line conductors 1 and 2 leading to a telephone central office 4. The line conductors 1 and 2 enter a line circuit section 6 of the office 4 and connect to a distributing frame 8. A further distributing frame 10 is provided, connecting to two sets of tip, ring and sleeve leads T1, R1, S1 and T2, R2, S2 respectively. The first set of leads T1, R1, S1 serves for all outgoing and for ordinary incoming calls for station A, leads T1, R1 being connected to line conductors 1, 2 respectively and lead S1 being connected through a billing meter M1 and diode 12 to ground. The second set of leads T2, R2, S2 serves for all outgoing and for ordinary incoming calls for station B, leads T2, R2 being connected to line conductors 2, 1 respectively, and lead S2 being connected through a billing meter M2 and diode 14 to ground.

Line and cutoff relays L1 and CO1 for station A, and L2 and CO2 for station B, are provided, relay L1 being connected to lead R1 through cutoff relay contacts CO1–1 and CO2–1, and relay L2 being connected to lead R2 through cutoff relay contacts CO1–2 and CO2–2. Cutoff relays CO1 and CO2 are connected to sleeve leads S1 and S2 respectively.

In the embodiment of the invention illustrated in FIG. 1, it is assumed that the central office 4 is a common control office (e.g. a No. 5 crossbar office), and accordingly, the two sets of leads T1, R1, S1 and T2, R2, S2 extend from distributing frame 10 to respective locations 16 and 18 on a line link frame 20. Line link frame 20 forms part of a switching train 22 of the central office 4. (In practice, line relays L1 and L2 will normally be physically located on the line link frame 20, and cutoff relays CO1 and CO2 may be constituted by mold magnets on the line link frame, the cutoff relay contacts illustrated being constituted by extra contacts on the hold magnets.)

The central office 4 also includes a special revertive call relay set 24, for use when a revertive call is made.

Relay set 24 includes tip, ring and sleeve leads T3, R3, S3, line supervision relays LS1 and LS2, ringing connect and ringing trip relays RC and RT respectively, a slow release controls relay S, and a slow release meter relay CH.

More detailed reference is next made to the subscriber stations A and B. These stations are identical except for their connection to line conductors 1 and 2, and therefore only subscriber station A will be described. Elements in station B corresponding to elements in station A are denoted by primed reference numerals. As shown in FIG. 1, station A includes a series connection of a diode D1, a relay X, telephone transmitting and receiving means generally indicated at 26, and a switch-hook contact SH–1, all connected between line conductor 1 and a reference point 28. From reference point 28, a connection is made, via a dial break contact *d*–1 and a further diode D2, to line conductor 2. As shown, diodes D1 and D2 are poled to permit direct current flow from line 1 through telephone transmitting and receiving means 26 to line 2, but substantially prevent direct current flow in the reverse direction. Diode D2 is shunted by a normally closed switch-hook contact SH–4.

Ringer means are provided consisting of a pair of ringer coils R1 and R2 (typically 1000 and 2700 ohms respectively) connected, through a capacitor C1, between reference point 28 and ground. In addition, a switch-hook contact SH–2 is connected across coil R2 and capacitor C1.

Figure 2:
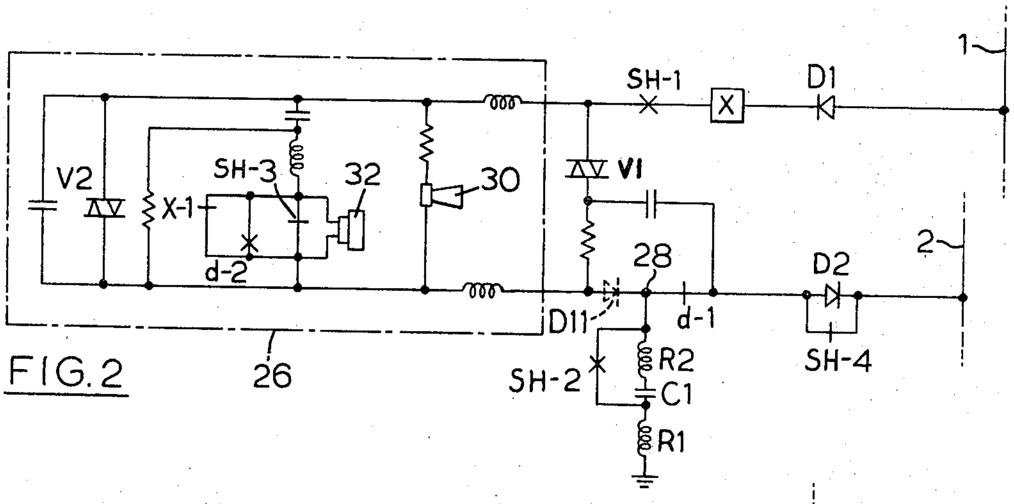
FIG. 2 shows in more detail the circuit at one of the subscriber stations.

The circuit at subscriber station A is shown in more detail in FIG. 2. As shown in FIG. 2, the telephone transmitting and receiving means 26 are conventional and include a transmitter 30 and a receiver 32 connected together with a standard sidetone balancing network. Varistors V1 and V2 are conventional and are provided to compensate for variations in loop impedances. Connected across receiver 32 are the usual dial contact *d*–2, switch-hook contact SH–3, and in addition, a contact X–1 of relay X.

The operation of the circuits so far described is as follows.

ORDINARY OUTGOING CALLS

Suppose the party at station A wishes to make an ordinary outgoing call, i.e. a call to some station other than station B. The party at station A then lifts his telephone handset (not shown per se), closing switch-hook contacts SH–1, SH–2 and opening contacts SH–3, SH–4. Ground is then extended through ringer coil R1, contact SH–2, dial contact *d*–1, diode D2, line conductor 2, and lead R1 to operate line relay L1. Line relay L2 will not operate at this time due to the presence of diode D1, which blocks a possible path through closed switch-hook contact SH–1 to line conductor 1 and lead R2.

When relay L1 operates, it effects engagement, in a conventional manner, of a dial tone marker (not shown), which in turn connects an idle originating register (not shown) to leads T1, R1, S1 to supply the party at station A with dial tone, informing him that he may dial. When the originating register is so connected, ground is placed on sleeve lead S1 to operate cutoff relay CO1, releasing line relay L1 and preventing line relay L2 from operating should the party at station B now wish to make a call. (In typical No. 5 crossbar offices, but not necessarily in other crossbar offices, the cutoff relay contacts are in fact as mentioned, hold magnet contacts and operate when the hold magnets, not shown, operate to connect an originating register to leads T1, R1.)

The party at station A now dials the desired number in the usual manner, and the switching train 22 connects him to the called party.

It will be noted that the invention prevents interference by one party when the other is making or receiving a call, since once one party has instituted a call, the line relay of the other party cannot operate. The invention also provides substantial secrecy since, when the party at station A, for example, makes a call (except a revertive call), line 1 becomes positive and line 2 becomes negative (these are the voltage polarities applied by the central office 4), reverse biasing diodes D1′ and D2′ at station B. Thus, substantially no current can flow through the telephone transmitter or receiver at station B. In practice, diodes D1 and D2 provide about 60 db attenuation, and in some cases, since the ear may be very sensitive, more attenuation may be desired. In that case, relay X is provided, with contact X–1 normally short circuiting the receiver 32. Thus, a party at either station will hear nothing in his receiver until his relay X operates, and relay X at station A for example, cannot operate when the party at station B makes or receives a call, because diodes D1 and D2 at station A are reverse biased at this time.

REVERTIVE CALLS

Assume that the party at station A wishes to call the party at station B, i.e. a revertive call is to be placed. When the party at station A lifts his telephone handset, line relay L1 operates as before, and an originating register (not shown) is as before connected to leads T1, R1, S1 to operate relay CO1 and to supply dial tone to the party at station A. The party at station A then dials the telephone number for station B into the originating register. The register then engages a completing marker (not shown) and indicates to it the line location of the calling line and the called number. The marker determines that the line location of the called line (location 16) is equivalent to that of the calling line (location 18) and hence that the call is a revertive call, and it then establishes connections through the switching train 22 to connect leads T1, R1, S1 to leads T3, R3, S3 respectively of the revertive call relay set 24.

The method of reaching a revertive call relay set in which the marker recognizes that the calling and called line locations are the same or equivalent is standard and is used in existing systems. In the present system, line locations 16 and 18 may conveniently be, not only in the same line link frame 20, but also in the same vertical file and group, and in adjacent horizontal groups, in the line link frame.

When the marker effects a connection of leads T1, R1, S1 to the revertive call relay set 24, it also operates a relay F (not shown) for a short period of time to close contacts F–1 and F–2 (FIG. 1) to operate relays RC and S. When relay RC operates, contact RC–6 operates meter relay CH. In addition, relay RC locks operated through contacts RC–4 operated, RT–1 released, and S–1 operated.

When relays RC, S and CH operate, ground is extended through operated contacts S–2, RC–5 and CH–1 onto sleeve lead S3 to hold the preceding switching train and cutoff relay CO1 operated.

In addition, supervision relay LS2 operates to establish supervision for the calling station A. The operate path for relay LS2 is from −48 volts through contacts RC–2 operated, relay LS2, leads R3 and R1, line 2, diode D2, dial contact *d*–1, switch-hook contact SH–2, and coil R1 to ground. Contact LS2–1 then closes to lock relays S and CH operated. The term "supervision" as supplied to relay LS2 means that if the party at station A should at this stage hang up, relay LS2 will release and its contact LS2–1 will open to release relays RC, S and CH, thus removing ground from sleeve lead S3 and releasing all connections.

An A.C. ringing voltage (typically 90 volts, 20 cycles) is now applied, with a superimposed D.C. voltage, typically −130 volts, D.C., through relay RT, contacts RC–1 operated, leads T3 and T1, line 1, closed contacts SH′–4 and *d*′–1, coil R2′, capacitor C1′, and coil R1′ to ground, thus ringing the telephone at station B. The ringing voltage cannot enter the ringer coils at station A via diode D1 because diode D1 is reverse biased by the −130 volts D.C. (which D.C. voltage is greater in magnitude than the peak A.C. ringing voltage), so there is no ringing at station A. The average D.C. level of the ringing current is zero at this time (due to the blocking effect of diode D1 at station A, and capacitor C1′ at station B) so that ringing trip relay RT cannot operate.

When the party at station B answers, switch-hook contact SH′–4 opens to remove the shunt from diode D2′. In addition, switch-hook contact SH′–2 closes to bypass coil R2′ and capacitor C1′, and the direct current path thus established perimts ringing trip relay RT to operate. Contact RT–1 then opens to release ringing connect relay RC, which then remains released due to opening of contact RC–4.

When relay RC releases, contacts RC–1 release to remove ringing current from the circuit and to release relay RT. In addition contacts RC–2 release to switch the voltage supplied to the left hand side of relay LS2 from −48 volts to +48 volts. This positive voltage reverse biases diode D2, so that relay LS2 no longer provides supervision for station A but instead now provides supervision for station B. The new holding path for relay LS2 is through leads R3 and R1, line 2, diode D1′, relay S′, transmitting and receiving means 26′, contacts SH′–1 and SH′–2, and coil R1′ to ground. Supervision for the calling station A is provided by relay LS1, which operates when relay RC releases. The operate path for relay LS1 is from +48 volts through relay LS1, contacts RC–1 released, leads T3 and T1, line 1, diode D1, relay S, transmitting and receiving means 26, contacts SH–1 and SH–2, and coil R1 to ground. When relay LS1 operates, its contact LS1–1 provides a new holding path for slow release relay S, the former holding path through contacts RC–3 operated having disappeared when relay RC released.

The +48 volts supplied through relays LS1 and LS2 to the parties provides talking voltage for the parties, the coils of relays LS1 and LS2 being of high A.C. impedance. The necessary speech bridge is provided by a talking capacitor C2. Diodes D2 and D2′, being reverse biased, prevent the talking voltage from being diverted to ground through ringer coils R1, R1′ respectively.

In addition, when the party at station B answers as described, operating relay RT to release relay RC, contact RC–6 opens to release slow release meter relay CH. The fast release of contacts RC–5, coupled with the slower release of contacts CH–1, provides a brief +48 volt pulse on sleeve lead S3 to operate billing meter M1.

When the conversation terminates and one or both parties release, either relay LS1 or relay LS2 or both will release, thus releasing relay S. Contact S–2 then opens to remove ground from sleeve lead S3 to release the connection to the revertive call relay set.

If, instead of station A calling station B as just described, station B were to call station A, then the common control equipment would connect leads T2, R2, S2 instead of leads T1, R1, S1, to leads T3, R3, S3 respectively of the revertive call relay set.

SUMMARY OF FUNCTIONS OF DIODES D1 AND D2

In summary, diode D1 serves three main purposes. Firstly, when party A lifts his telephone to make a call, diode D1 prevents operation of party B's line relay L2. Secondly, when party A makes a revertive call, diode D1 prevents ringing from entering the ringer means at party A's telephone. Thirdly, when party B makes an ordinary outgoing call, diode D1 becomes reverse biased by the potentials applied by the central office 4 to the line conductors 1 and 2 and thus assists in preventing party A from overhearing party B's conversation.

Diode D2 serves no particular function (due to its shunt by contact SH–4) until party A lifts his telephone. Then, if the call is a revertive call, diode D2 is reverse biased during conversation (by the +48 v. talking battery applied through relay LS2) to prevent the talking voltage from being shunted to ground through contact SH–2 and coil R1. If party B is in the midst of a call when party A lifts his telephone, diode D2 becomes reverse biased and improves the secrecy of party B's conversation.

The reason for shunting diode D2 with contact SH–4 is as follows. When a call is made to party A (from party B or some other person) diode D2 would, if it remained in the circuit, tend to prevent party A's telephone from ringing. This is because, if diode D2 is in the circuit during ringing of party A's telephone (at which time a ringing voltage with an A.C. component is placed on line conductor 2), then capacitor C1 will charge to the peak negative ringing voltage and remain charged, with no way to discharge. Diode D2 then remains reverse biased, and no ringing current can pass through party A's telephone.

To permit ringing to occur, diode D2 is shunted by normally closed contact SH–4. During ringing of party A's telephone, diode D2 is out of the circuit and does not interfere with the ringing. When party A answers, the shunt across diode D2 is removed, so that diode D2 can perform its functions as above described.

MODIFICATIONS

If desired, the shunt across diodes D2 and D2′ can be eliminated (i.e. contacts SH–4 and SH′–4 can be removed), and instead, a resistance can be placed across capacitors C1, C1′. Such resistances are indicated in dotted lines at 40 and 40′ in FIG. 1. Resistance 40, for example, will be low enough to permit sufficient ringing current to pass through coils R1, R2 to cause ringing, and will be high enough to prevent operation of relay RT until part A answers. Further, resistance 40 will be high enough so that when party A hangs up, the supervision relays (e.g. relay LS2 when party A makes a revertive call) will release. In addition, since resistance 40 will cause continuous current to be drawn through line relay L1 when party A's telephone is not in use, it should be high enough so that such current will not operate relay L1. The same considerations apply to resistance 40′.

In one system built in accordance with the present invention, resistances 40 and 40′ were provided by leaky capacitors C1 and C1′ (i.e. no separate resistors were required) and the system operated satisfactorily. A disadvantage of resistances 40 and 40′ is that there is some current drain when the system is not in use.

It will be realized that if desired, the polarity of the diodes shown could be reversed, with voltages of polarity opposite to those shown then being used. However, the diode and voltage polarities shown are compatible with North American telephone equipment and would normally be used in North America.

If desired, the location for diode D1 could be changed, as shown in dotted lines in FIG. 2, the new diode location being indicated at D11. In this arrangement the ringing means at subscriber station A will still be isolated from line conductor 1 when station A makes a revertive call, so that ringing current (with superimposed D.C. voltage) on line conductor 1 will operate the ringing means of station B but not that of station A.

Figure 3:
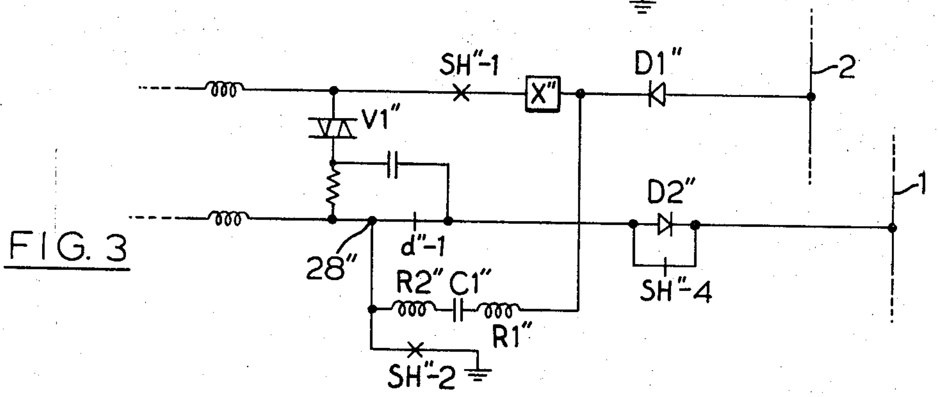
FIG. 3 shows a modification of the subscriber station of FIG. 2.
Figure 4:
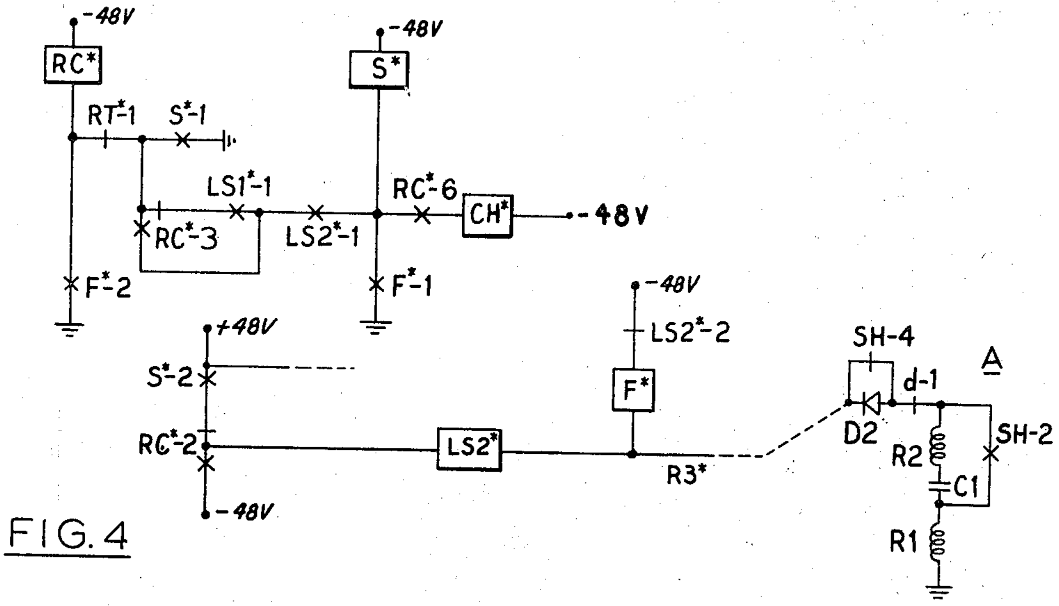
FIG. 4 shows a modified revertive call relay set for use in a step-by-step central office.

The arrangement for the ringer coils may be varied if desired as shown in FIG. 3, where double primed reference numerals indicate elements corresponding to those of station B. The FIG. 3 arrangement is the same as that of FIG. 2 except that the side of ringer coil R1″ remote from capacitor C1″ has been connected to the cathode of diode D1″ instead of to ground, so that the circuit for the ringing current is now completed back through line conductor 2 and relay LS2 to −48 volts. The lead containing contact SH″–2 has been connected to ground, in order to provide a seizure ground to operate line relay L2 when the party at station B lifts his handset. The D.C. bias voltage superimposed on the ringing voltage will typically be increased by about 48 volts to −178 volts, in order to maintain diodes D1′ and D2′ of station B reverse biased during ringing.

In the system just described, it has been assumed that the central office 4 is a common control office. If the office 4 is a direct control office, such as a step-by-step office, then the revertive call relay set 24 will be reached when the calling party dials a special code, such as "1191," this already being a standard method of reaching revertive call relay sets in existing step-by-step offices. In this case, the switching train 22 will be composed of selector switches, rather than crossbar switches.

In addition, in a step-by-step office the revertive call relay set 24 will be altered slightly, as shown in FIG. 3, where reference numerals marked with an asterisk (*) indicate corresponding parts. When connection is made from a calling party station e.g. station A, to the revertive call relay set 24* of FIG. 3, ground appears on lead R3* (due to closing of switch-hook contact SH–2) to operate relay F*. Contacts F*–1 and F*–2 then operate relays RC* and S* are before, and once relay RC* operates, contacts RC*–2 operate to permit relay LS2* to operate. Contact LS2*–2 then opens to release relay F* and the remainder of the operation continues as described for the apparatus of FIG. 1. Contact S*–2 is provided to prevent undesired operation of relays LS2* and F* from +48 v. to −48 v.

RINGING VOLTAGE CONSIDERATIONS

Figure 5:
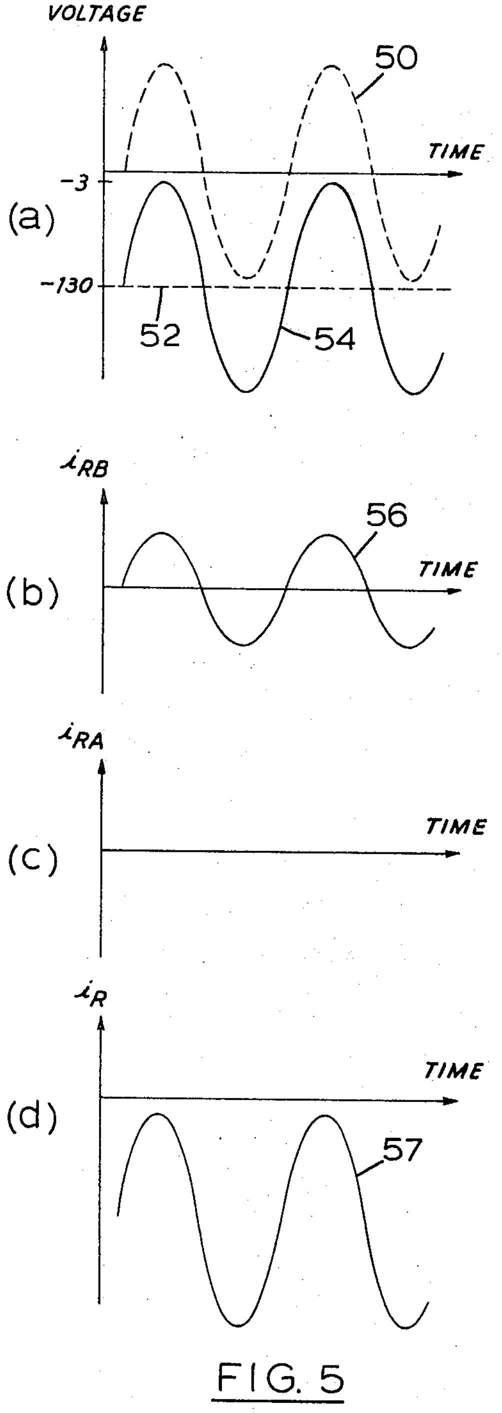
FIG. 5 shows ringing voltage and current waveforms for the circuit of FIG. 1.

It has been assumed in the foregoing discussion that the D.C. bias voltage superimposed on the A.C. ringing voltage is greater than the peak A.C. ringing voltage, so that there is no D.C. ringing current until the called party answers. Approximate voltage and current waveforms for this situation are shown in FIG. 5. (It is assumed that contacts SH–4, SH′–4 are used to bypass diodes D2, D2′ during ringing, resistances 40, 40′ thus being omitted.)

Figure 6:
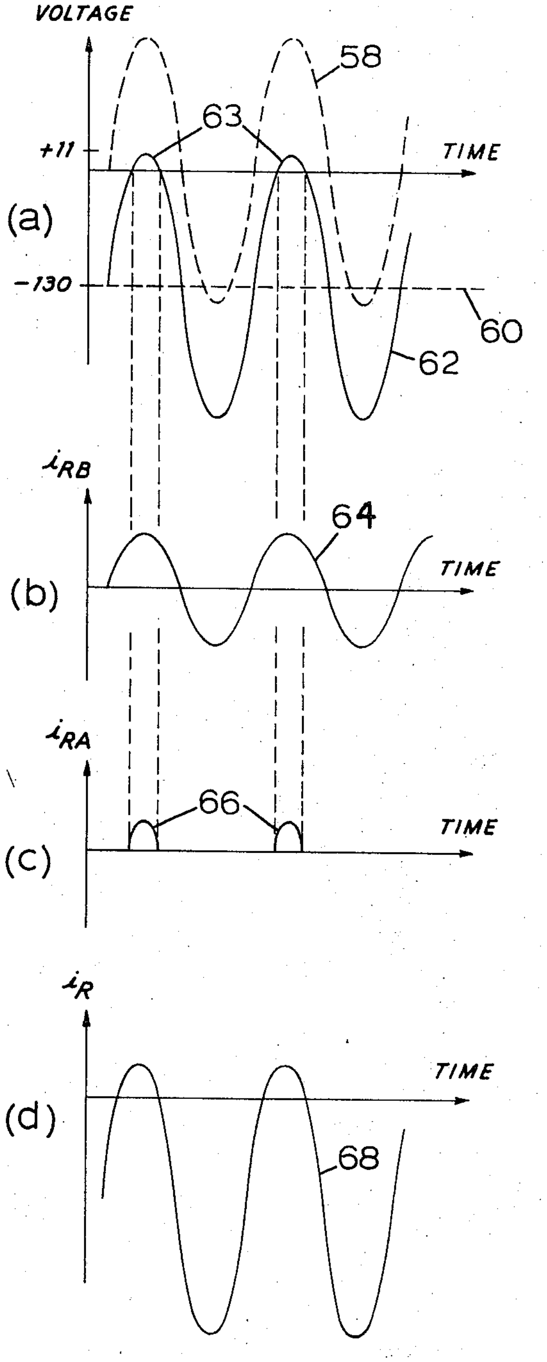
FIG. 6 shows ringing voltage and current waveforms for the circuit of FIG. 1 when the peak A.C. ringing voltage component exceeds the D.C. ringing voltage component.

In FIG. 5(*a*) the A.C. component of the ringing voltage is shown in dotted lines as a sinusoidal waveform 50, the D.C. component is shown at 52, and the resultant composite ringing voltage is shown at 54. Assuming that station A is calling station B, the resultant current $i_{RB}$ through the ringer coils and capacitor R2′, C1′, R1′ of station B is shown at 56 in FIG. 5(*b*). (The phase relations shown between the voltages and currents in FIGS. 5 and 6 are arbitrary and will, in a given system, depend on the system parameters, e.g. on the resistance, inductance and capacitance associated with the ringing circuit.)

The current $i_{RA}$ through the ringing means of station A is substantially zero, because of reverse biased diode D1, as shown in FIG. 5(*c*). It is found in this situation that, with relay X absent, the calling party at station A can still hear ringing in his earpiece even with diode D1 reverse biased. This occurs because the ringing is a powerful signal, and the attenuation provided by the diode is not sufficient to attenuate the ringing signal to an inaudible level. Thus, the calling party at station A can determine whether or not party B's telephone is ringing.

Once the called party at station B answers, so that capacitor C1′ is bypassed, the average level of the resultant composite ringing current $i_R$ shifts, as shown at 57 in FIG. 5(*b*), to a level such that relay RT operates to terminate the ringing.

If desired, the D.C. component of the ringing voltage may be made less than the A.C. component, so long as the resulting current does not trip the ringing trip relay RT prematurely. Such a situation is shown in FIG. 6, where it is assumed that the A.C. component of the ringing voltage, shown at 58, is now 100 volts R.M.S., or 141 volts peak, and that the D.C. component, shown at 60, is still −130 v. The resultant composite ringing voltage 62 has excursions 63 above the zero axis.

The current $i_{RB}$ through the ringer coils and capacitor of station B, shown diagrammatically at 64 in FIG. 6(*b*), is similar to the corresponding current waveform 56 in FIG. 5. (If diode D2′ is not shunted by contact SH′–4, but instead resistance 40′ is present, then diode D2′ will be reverse biased during part of each cycle, but there will still be an A.C. ringing current component sufficient to produce ringing.)

An appreciable current $i_{RA}$ now passes through contact SH–2 and coil R1 at station A at times when diodes D1 and D2 are forward biased by positive excursions 63 of the ringing voltage. However, the magnitude of this current, indicated at 66 in FIG. 6(*c*), is insufficient to create ringing at station A (although it will provide a louder ringing tone in the calling party's earpiece).

In addition, the average level of current 66 is below that needed to operate relay RT. In other words, relay RT has a minimum average current requirement below which it will not operate, and the magnitude of D.C. component 60 is such that the average level of current 66 remains below this level.

(If station B is provided with resistance 40′ instead of contact SH′–4, then the ringing current $i_{RB}$ through the ringing means at station B will have a D.C. component that will tend to cancel to some extent any tendency of current $i_{RA}$ to operate relay RT prematurely, i.e. the D.C. components of currents $i_{RB}$ and $i_{RA}$ will be of opposite polarity.)

Once the called party at station B answers, so that capacitor C1′ is bypassed, the average level of the composite ringing current $i_R$ (i.e. the total ringing current through line conductor 1, shown at 68 in FIG. 5(*d*)) becomes such that relay RT operates to terminate the ringing.

It may be noted that in practice, there will usually not be a precisely defined current level above which a relay RT will operate and below which it will not. In practice, because of variations from relay to relay, and because of relay aging, etc., different ringing trip relays may operate at slightly different currents. Thus, there will in effect be a band of current values, above which band it may safely be assumed that a ringing trip relay will operate and below which band such relay will not operate. At current values within this band, it may be indeterminate as to whether the RT relay will operate. The D.C. component 60 will be sufficiently large that the average level of current 68 is above this band.

Although the A.C. ringing voltage component applied by the revertive call relay set has been shown as a sinusoidal waveform, other waveforms can be used, so long as the resultant current levels are such that only the called party's telephone will ring upon initiation of a revertive call, and so that relay RT will not operate until the called party answers.

What I claim as my invention is:

1. For a two party telephone system including first and second line conductors leading to a central office, said central office including generating means for generating a pulsating ringing voltage; a subscriber station for connection to said line conductors and comprising:

(a) switch-hook means operative when said subscriber station is in use by a subscriber, (b) telephone transmitting and receiving means, (c) first and second diode means, (d) means connecting said first and second diode means and said telephone transmitting and receiving means in series to form a series connection, said first and second diode means being poled in the same direction to permit direct current flow through said series connection in one direction while substantially preventing direct current flow through said series connection in the other direction, (e) means for connecting one end of said series connection to one of said line conductors, and means for connecting the other end of said series connection to the other of said line conductors, (f) telephone ringing means connected to said series connection, said telephone ringing means including means responsive to application of said ringing voltage to produce ringing, (g) means for connection to a source of reference potential, (h) and means connected between said means (g) and a point in said series connection between said first and second diode means and responsive to operation of said switch-hook means for providing a direct current path between said means (g) and said point in said series connection, whereby when a talking voltage of predetermined potential relative to said reference potential is applied through both said line conductors to both ends of said series connection, one of said diode means will become reverse biased and the other forward biased to permit conduction from one only of said line conductors through said means (b), (h) and (g) to said source of reference potential.

2. Apparatus according to claim 1 wherein said source of reference potential is ground.

3. Apparatus according to claim 2 wherein said means responsive to application of said ringing voltage includes normally closed switch-hook contact means connected in parallel with said one diode means.

4. Apparatus according to claim 2 wherein said means responsive to application of said ringing voltage includes ringer coils and a capacitance in series, and resistance means in parallel with said capacitance.

5. In a telephone system, a two party line arrangement comprising:

(a) first and second line conductors, (b) first and second subscriber stations, each comprising:

(1) a switch-hook operative when its subscriber station is in use by a subscriber, (2) telephone transmitting and receiving means, (3) a first diode, (4) means connecting said telephone transmitting and receiving means, and said first diode, in series to form a first series connection, (5) means connecting one side of said series connection to a selected point, (6) means, including a second diode, connected to said selected point to form, with said telephone transmitting and receiving means and said first diode, a second series connection, (7) means connecting said second series connection between said line conductors, (8) telephone ringing means connected to said second series connection and including means responsive to application of a pulsating ringing voltage to one of said line conductors to produce ringing, (9) means, including a first normally open switch-hook contact, for providing a direct current path between ground and said selected point, (c) said first and second diodes of said first station being poled in the same direction to permit direct current flow through said second series connection of said first station from one of said line conductors to the other while substantially preventing direct current flow from said other line conductor through said second series connection of said first station to said one line conductor, (d) said first and second diodes of said second station being poled to permit direct current flow through said second series connection of said second station from said other line conductor to said one line conductor while substantially preventing direct current flow from said one line conductor through said second series connection of said second station to said other line conductor, (e) a central office coupled to said line conductors, said central office including revertive call placing means comprising:

(1) generating means for generating said pulsating ringing voltage, (2) means responsive to institution of a revertive call by a calling one of said subscriber stations for applying said ringing voltage to a selected one of said line conductors to operate said telephone ringing means at the other subscriber station, (3) said generating means including means operative in response to operation of the switch-hook at said other station, indicating answering at said other station, for terminating generation of said ringing voltage, and (4) means responsive to said operation of said switch-hook at said other station for applying a same potential talking voltage to both said line conductors, said talking voltage being of a polarity to forward bias said first diode and reverse bias said second diode of each subscriber station, to permit talking current to pass through said telephone transmitting and receiving means of each subscriber station and through said switch-hook contact of each station to ground.

6. Apparatus according to claim 5 wherein said means responsive to application of said ringing voltage includes ringer coils and a capacitance in series and connected between said selected point and ground, and a second normally closed switch-hook contact connected in parallel with said second diode.

7. Apparatus according to claim 5 wherein said means responsive to application of said ringing voltage includes ringer coils and a capacitance in series, and resistance means in parallel with said capacitance.

8. Apparatus according to claim 5 wherein said means (e)(4) includes means operative in response to application of ground to said selected point of said other station through said switch-hook contact of said other station, to initiate said application of said same potential talking voltage to said line conductors, said central office also including speech bridge means, and means to connect said speech bridge means between said line conductors following said closing of said first switch-hook contact of said other subscriber station.

9. Apparatus according to claim 5 wherein said central office includes (1) switching train means, (2) first tip and ring leads connected to said first and second line conductors respectively, (3) second tip and ring leads connected to said second and first line conductors respectively, (4) first line switch means associated with said first tip and ring leads and responsive to ground applied to said selected point of said first station, when said switch-hook contact of said first station closes, to connect said first tip and ring leads to said switching train means, said first tip and ring leads thus being those of said first station, (5) second line switch means associated with said second tip and ring leads and responsive to ground applied to said selected point of said second station, when said switch-hook contact of said second station closes, to connect said second tip and ring leads to said switching train means, said second tip and ring leads thus being those of said second station.

10. Apparatus according to claim 9 wherein said switching train means includes means for connecting said first tip and ring leads to said revertive call placing means when a subscriber at said first station makes a revertive call, and for connecting said second tip and ring leads to said revertive call placing means when a subscriber at said second station makes a revertive call, said means (e)(2) including means responsive to connection of the tip and ring leads of a calling one of said subscriber stations thereto for applying said ringing voltage to one of said tip and ring leads connected thereto, said ringing voltage having a pulsating component and a direct current component, the polarity of said direct current component of said ringing voltage being a polarity tending to forward bias said diodes of the other subscriber station and to reverse bias said diodes of said calling subscriber station for said ringing voltage to actuate the ringing means only of said other subscriber station.

11. Apparatus according to claim 9 wherein said central office further includes a first sleeve lead associated with said first tip and ring leads, a second sleeve lead associated with said second tip and ring leads, and said revertive call placing means includes third tip, ring and sleeve leads, said switching train means including means for connecting said first tip, ring and sleeve leads to said third tip, ring and sleeve leads respectively when a subscriber at said first station makes a revertive call, and for connecting said second tip, ring and sleeve leads to said third tip, ring and sleeve leads respectively when a subscriber at said second station makes a revertive call, said revertive call placing means further including (4) first supervision relay means coupled to said third tip lead, (5) second supervision relay means coupled to said third ring lead, (6) means responsive to connection of said third tip, ring and sleeve leads to the tip, ring and sleeve leads of a calling subscriber station to apply, through said second supervision relay, a voltage to the ring lead of said calling station of a first polarity to forward bias said second diode of said calling station, thus to operate said second supervision relay over a path including said second diode and said first switch-hook contact of said calling station, (7) means for applying ground to said third sleeve lead to cause said switching train means to maintain a connection between said calling station and said revertive call placing means and including means responsive to release of said second supervision relay to remove ground from said third sleeve lead thus to release such connection, (8) said means for applying said ringing voltage including means for applying said ringing voltage to said third tip lead, (9) said means (e)(4) including means responsive to closing of said first switch-hook contact of said other station for connecting said first supervision relay means to said third tip lead and for applying a voltage of a second polarity opposite from said first polarity through said first and second supervision relays to said third tip and ring leads respectively, thus to operate said first supervision relay over a path including said third tip lead, the tip lead of said calling station, and said first diode and said first switch-hook contact of said calling station to ground, and to maintain said second supervision relay operated over a path including said third ring lead, the ring lead of said calling station, and said first diode and said switch-hook contact of said other station to ground, said second polarity voltage constituting a talking voltage for said stations,

(10) speech bridge means, and means for connecting said speech bridge means between said third tip and ring leads upon termination of application of said ringing current voltage to said third tip lead,

(11) and said means (7) for applying ground to said third sleeve lead further including means responsive to release of said first supervision relay for removing ground from said third sleeve lead.

References Cited

UNITED STATES PATENTS 3,277,242 10/1966 Grote ------------- 179—17.2

FOREIGN PATENTS 1,077,269 3/1960 Germany.
1,152,156 8/1963 Germany.

KATHLEEN CLAFFY, Primary Examiner

J. S. BLACK, Assistant Examiner